United States Patent
Hasan et al.

(10) Patent No.: US 11,971,923 B2
(45) Date of Patent: Apr. 30, 2024

(54) SYSTEM AND METHOD OF DEVELOPING A SEARCH DATABASE FOR AUTOMATED CONTENT CURATION

(71) Applicant: Quantiphi Inc., Marlborough, MA (US)

(72) Inventors: Asif Hasan, Marlborough, MA (US);
Saurabh Mishra, Marlborough, MA (US); Biplab Mahadani, Mumbai (IN); Abhishek Patra, Mumbai (IN); Shubham Swastik Behera, Mumbai (IN); Eshan Tyagi, Mumbai (IN); Aniket Mohite, Mumbai (IN); Siddharth Singh, Mumbai (IN); Sanket Avinash Jejurkar, Mumbai (IN)

(*) Notice: Subject to any disclaimer, the term of this patent is extended or adjusted under 35 U.S.C. 154(b) by 158 days.

(21) Appl. No.: 17/809,009

(22) Filed: Jun. 26, 2022

(65) Prior Publication Data
US 2023/0195777 A1    Jun. 22, 2023

Related U.S. Application Data

(60) Provisional application No. 63/291,663, filed on Dec. 20, 2021.

(51) Int. Cl.
*G06F 16/51* (2019.01)
(52) U.S. Cl.
CPC ................... *G06F 16/51* (2019.01)
(58) Field of Classification Search
CPC ....................................................... G06F 16/51
See application file for complete search history.

(56) References Cited

U.S. PATENT DOCUMENTS

| | | | |
|---|---|---|---|
| 7,546,533 B2 | 6/2009 | Sareen et al. | |
| 8,521,732 B2 | 8/2013 | Wood et al. | |
| 10,642,888 B2 | 5/2020 | Nauerz et al. | |
| 2006/0294046 A1* | 12/2006 | Sareen | G06F 40/169 |
| 2014/0181204 A1* | 6/2014 | Sharp | G06F 16/9535 |
| | | | 709/204 |

OTHER PUBLICATIONS

Canva application detailed web-page retrieved from "www.canva.com" on Mar. 17, 2022, 6 pages.

* cited by examiner

*Primary Examiner* — Cam Y T Truong
(74) *Attorney, Agent, or Firm* — RC Trademark Company (57) ABSTRACT

The present disclosure describes a system and method of developing a search database for automated content curation. The processing arrangement is configured to store a plurality of slides related to one or more fields in the database arrangement, generate a plurality of thumbnails from the stored plurality of slides, extract a plurality of metadata from the plurality of thumbnails, wherein the plurality of metadata are extracted by processing the generated plurality of thumbnails through an optical character reader, store the extracted plurality of metadata into the search database, create an index comprising of associations between the plurality of slides, the plurality of associated metadata and the generated plurality of thumbnails, store the created index in the search database and curate content from the index of the search database based on the one or more search strings.

25 Claims, 5 Drawing Sheets

FIG. 5

SYSTEM AND METHOD OF DEVELOPING A SEARCH DATABASE FOR AUTOMATED CONTENT CURATION

FIELD OF INVENTION

In general, the present disclosure is related to a system and method of developing a search database for automated content curation. In particular, the invention disclosed in the present disclosure relates to a system and method for the content management from content collection to content accessibility for future re-use and adding values to it throughout its lifecycle.

BACKGROUND

Content collection, curation and management is critical to the social and organizational research process. When implemented correctly, content curation process enhances the quality of operations being carried out in an organization. The content curation including content collection, processing and management enhances the quality of a research study. However, the curation of relevant contextual content from a content-set containing vast amount of findings including research papers, publications, presentations, test results and so forth, is a cumbersome and time-consuming task. Manual content curation including content collection, content accessibility and content identification makes the relevant content items prone to errors as the user has to go manually through numerous irrelevant content items to reach the relevant result. In addition to it, there may be errors caused during the manual content entry of various content data while manually changing content data. This can lead to significant negative consequences if the analysis is used to influence decisions. Another issue encountered in content change management or content curation is the presence of asymmetrical content: when information in the system in the database is left outdated. Furthermore, there exists no such tool in conventional content management system essentially related to a practical user feedback mechanism that can be widely used in an organization for collaboration between different companies or teams.

The essential part for a content curation process involves content collection, wherein the user has to search for a relevant content in the search database via a search query and retrieve relevant content. However, while searching for the relevant content from the database arrangement, a user may lack sufficient skill or information to formulate a query to search the database effectively. In addition, each search of the database may consume a significant amount of time and processing energy of the system. The use of the significant amount of time may deter a user from developing a complete query or a thorough set of queries. The user may be encouraged to take shortcuts in generating a query. As a result, the quality of a query generated by a user and/or a number of queries may be limited, and a desired information may be unavailable. Also, when free-form or even full text search is used over a large corpus, a voluminous amount of possible search results are still retrieved that may require the user to quickly and efficiently sort through these many options. In majority of the instances, this can become a cumbersome and tedious task for the user.

Therefore, in light of the foregoing discussion, there exists a need to overcome the aforementioned drawbacks in the content curation from content collection, processing to content accessibility and adding values to the content throughout its lifecycle.

SUMMARY

An object of the present disclosure is to provide a system of developing a search database for automated content curation.

Another object of the present disclosure is to provide a method of developing a search database for automated content curation.

Another object of the present disclosure is to provide an automated system that undergoes the content curation tasks namely, content collection, processing to content accessibility for future re-use and adding values to the content throughout its lifecycle.

In an aspect, embodiments of the present disclosure provide a system of developing a search database for automated content curation, wherein the system comprises:

a processing arrangement comprising a communication interface for accessing a computer network and a database arrangement, wherein the processing arrangement is configured to:
store a plurality of slides related to one or more fields in the database arrangement;
generate a plurality of thumbnails from the stored plurality of slides;
extract a plurality of metadata from the plurality of thumbnails, wherein the plurality of metadata is extracted by processing the generated plurality of thumbnails through an optical character reader;
store the extracted plurality of metadata into the search database;
create an index comprising of associations between the plurality of slides, the plurality of associated metadata and the generated plurality of thumbnails, wherein one or more relevant slides are retrieved in response to one or more search strings via said associations between the plurality of slides, the plurality of associated metadata and the generated plurality of thumbnails;
store the created index in the search database; and
curate a plurality of content from the index of the search database based on one or more search strings.

Optionally, the processing arrangement is configured to generate a plurality of thumbnails by extracting one or more features of the plurality of slides via at least one of an object recognition algorithm, an image recognition algorithm, and a text recognition algorithm.

Optionally, the plurality of metadata extracted from the plurality of thumbnails is stored in an elastic search database. Optionally, the processing arrangement is configured to store the created index in one or more of elastic search databases.

Optionally, the processing arrangement employs the plurality of metadata extracted from the generated plurality of thumbnails to retrieve the one or more relevant slides via fuzzy logic.

Optionally, the processing arrangement generates a plurality of thumbnails via an app-script based code.

Optionally, the processing arrangement receives the one or more search strings via a user's input and retrieves the one or more slides via the index stored in the search database, in response to the one or more search strings.

Optionally, the processing arrangement receives a user's selection of the one or more slides from the retrieved plurality of the one or more slides and curate the plurality of content by copying the selected one or more slides from a source location to a curated file at a target location, wherein a linking of the copied one or more slides at the target location is established with the one or more slides at the source location.

Optionally, the processing arrangement dispatches a communication to the user with the target location of the curated file.

Optionally, the processing arrangement is configured to receive a further selection of the one or more slides and add the selected one or more slides at an end of the curated file.

Optionally, the processing arrangement is configured to create an array of added content in the curated file, wherein the array acts as an index for the added content.

Optionally, the processing arrangement enables one or more users to suggest changes in the one or more slides stored in the database arrangement.

Optionally, the processing arrangement is configured to transmit a communication to an administrator of the one or more slides when the one or more users suggest changes in the one or more slides.

Optionally, the processing arrangement is configured to transmit a response communication to the one or more users stating a status of the suggested changes to the one or more slides.

In a second aspect, embodiments of the present disclosure provide a method of developing a search database for automated content curation, wherein the method comprises:
  storing a plurality of slides related to one or more fields in the database arrangement;
  generating a plurality of thumbnails from the stored plurality of slides;
  extracting a plurality of metadata from the plurality of thumbnails, wherein the plurality of metadata is extracted by processing the generated plurality of thumbnails through an optical character reader;
  storing the extracted plurality of metadata into the search database;
  creating an index comprising of associations between the plurality of slides, the plurality of associated metadata and the generated plurality of thumbnails, wherein one or more relevant slides are retrieved in response to one or more search strings via said associations between the plurality of slides, the plurality of associated metadata and the generated plurality of thumbnails;
  storing the created index in the search database; and
  curating a plurality of content from the index of the search database based on one or more search strings.

Optionally, the method comprises generating a plurality of thumbnails by extracting one or more features of the plurality of slides via at least one of an object recognition algorithm, an image recognition algorithm and a text recognition algorithm.

Optionally, the plurality of metadata extracted from the plurality of thumbnails is stored in an elastic search database.

Optionally, the method comprises storing the created index in one or more elastic search databases.

Optionally, the method comprises employing the plurality of metadata extracted from the generated plurality of thumbnails to retrieve the one or more relevant slides via fuzzy logic.

Optionally, the method comprises generating a plurality of thumbnails via an app-script based code.

Optionally, the method comprises receiving the one or more search strings via a user's input and retrieving the one or more slides via the index stored in the search database, in response to the one or more search strings.

Optionally, the method comprises receiving a user's selection of the one or more slides from the retrieved plurality of the one or more slides and curating the plurality of content by copying the selected one or more slides from a source location to a curated file at a target location, wherein a linking of the copied one or more slides at the target location is established with the one or more slides at the source location.

Optionally, method comprises dispatching a communication to the user with the target location of the curated file.

Optionally, the method comprises receiving a further selection of the one or more slides and adding the selected one or more slides at an end of the curated file.

Optionally, the method comprises creating an array of added content in the curated file, wherein the array acts as an index for the added content.

Optionally, the method comprises enabling one or more users to suggest changes in the one or more slides stored in the database arrangement.

Optionally, the method comprises transmitting a communication to an administrator of the one or more slides when the one or more users suggest changes in the one or more slides.

Optionally, the method comprises transmitting a response communication to the one or more users stating a status of the suggested changes to the one or more slides.

In a third aspect, embodiments of the present disclosure provide a non-transitory computer readable storage medium, containing program instructions for execution on a computer system, which when executed by a computer, cause the computer to perform method steps of a method of developing a search database for automated content curation, the method comprising the steps of:
  storing a plurality of slides related to one or more fields in the database arrangement;
  generating a plurality of thumbnails from the stored plurality of slides;
  extracting a plurality of metadata from the plurality of thumbnails, wherein the plurality of metadata is extracted by processing the generated plurality of thumbnails through an optical character reader;
  storing the extracted plurality of metadata into the search database;
  creating an index comprising of associations between the plurality of slides, the plurality of associated metadata and the generated plurality of thumbnails, wherein one or more relevant slides are retrieved in response to one or more search strings via said associations between the plurality of slides, the plurality of associated metadata and the generated plurality of thumbnails;
  storing the created index in the search database; and
  curating a plurality of content from the index of the search database based on one or more search strings.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

A better understanding of the present invention may be obtained through the following examples which are set forth to illustrate but are not to be construed as limiting the present invention.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item to which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognise that other embodiments for carrying out or practising the present disclosure are also possible.

In an aspect, embodiments of the present disclosure provide a system of developing a search database for automated content curation, wherein the system comprises:
- a processing arrangement comprising a communication interface for accessing a computer network and a database arrangement, wherein the processing arrangement is configured to:
  - store a plurality of slides related to one or more fields in the database arrangement;
  - generate a plurality of thumbnails from the stored plurality of slides;
  - extract a plurality of metadata from the plurality of thumbnails, wherein the plurality of metadata is extracted by processing the generated plurality of thumbnails through an optical character reader;
  - store the extracted plurality of metadata into the search database;
  - create an index comprising of associations between the plurality of slides, the plurality of associated metadata and the generated plurality of thumbnails, wherein one or more relevant slides are retrieved in response to one or more search strings via said associations between the plurality of slides, the plurality of associated metadata and the generated plurality of thumbnails;
  - store the created index in the search database; and
  - curate a plurality of content from the index of the search database based on one or more search strings.

The present disclosure provides the aforementioned automated content curation system that is designed to store, retrieve, define, edit and manage data in a database in an efficient way. Said content curation system also known as knowledge management solution, is built to enable better cross-functional content collaboration amongst different teams. The content curation system as defined herein generally provides the "content explorer" service to its consumers. In "content explorer", the user can find and create custom decks from the slides repository as provided by the content management tool.

In an exemplary embodiment, the present disclosure describes a system of automated content curation that involves creating a deck including a compiled file of a plurality of slides. For the automated creation of decks, i.e., automated content curation, the system involves receiving a user's input in the form of a search query and retrieving one or more slides (content) from the search database, in response to the search query. The retrieved one or more slides are displayed on a user interface. Furthermore, the system allows one or more users to select one or more slides from the plurality of slides and compile the selected one or more slides, and thereby creating a deck of the compiled plurality of slides. It will be appreciated that the term "automated content curation" refers to the creation of a deck of a plurality of content. In another embodiment, the term "automated content curation" refers to the creation of a deck of a plurality of slides related to one or more fields. In yet another embodiment, the term "automated content curation" refers to creation of deck of a plurality of slides that are particularly selected by one or more users via the user interface.

In order to provide an efficient content curation, the system involves developing a search database and retrieve via the developed search database, one or more relevant content in response to a user's query or search strings. The invention as described herein the present disclosure involves searching the relevant content through the metadata of the generated thumbnail of the content instead of the content itself, thereby saving a lot of processing energy while searching for the relevant content in the search database, resulting into a more efficient system. Furthermore, the time required to retrieve data content is also reduced herein.

The system as described herein comprises a "database arrangement". Throughout the present disclosure, the term "database arrangement" as used herein, relates to an organized body of digital information regardless of a manner in which the data or the organized body thereof is represented. Optionally, the database arrangement may be hardware, software, firmware and/or any combination thereof. For example, the organized body of digital information may be in a form of a table, a map, a grid, a packet, a datagram, a file, a document, a list or in any other form. The plurality of databases includes any data storage software and systems, such as, for example, a relational database like IBM DB2®, Google Cloud and Oracle 9®. Furthermore, the database arrangement also includes a software program for creating and managing one or more databases. Optionally, the database arrangement may be operable to support relational operations, regardless of whether it enforces strict adherence to a relational model, as understood by those of ordinary skill in the art. Additionally, the database arrangement is populated by the elastic search libraries, elastic search databases, at least one relevant data element, topic-based web content and the likes. Optionally, the database arrangement is populated by the operational data associated with the URIs, URLs and/or URNs and their related information.

According to the invention as described herein the present disclosure, the system comprises a processing arrangement. Throughout the present disclosure, the term "processing arrangement" as used herein relates to at least one programmable or computational entity configured to acquire process and/or respond to instructions for data curation. For example, the computational entity may include a memory, a network adapter and the likes. In another example, the processing arrangement includes, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit for executing data management and curation instructions. Furthermore, the processing arrangement includes one or more individual processors, processing devices and various elements of a computer system associated with a processing device that may be shared by other processing devices. Additionally, one or more individual processors, processing devices, and elements are arranged in various architectures for responding to and processing the instructions that drive the system for curation of either curated and/or non-curated data.

Moreover, the data processing arrangement is configured to host computer programs and/or routines that provide various services. For example, the services may include providing connectivity between the modules of the system, generating an interface to enable receiving input to the system, processing the extracted data, compiling it as a compiled file, providing a platform for search libraries or elastic search libraries, and so forth.

According to the present disclosure, the processing arrangement comprises the "communication interface" for accessing a computer network. Throughout the present disclosure, the term "communication interface" as used herein relates to an arrangement of interconnected components that are configured to facilitate data communication between one or more electronic devices, software modules and/or databases, whether available or known at the time of filing or as later developed. Furthermore, the communication interface facilitates data/content communication via a collection of interconnected (public and/or private) networks that are linked together by a set of standard protocols. Examples of standard protocols may include, but not limited to, Internet® Protocol (IP), Wireless Access Protocol (WAP), Frame Relay, Asynchronous Transfer Mode (ATM), Hypertext Transfer Protocol (HTTP), File Transfer Protocol (FTP), and the likes. Furthermore, any other suitable protocols using voice, video, data, or combinations thereof, can also be employed. The processing arrangement uses the communication interface to access the computer network that will be described later.

Throughout the present disclosure, the term "computer network" as used herein relates to a structure and/or module including interconnected computing components storing user-viewable hypertext documents (commonly referred to as Web documents or Web pages). Furthermore, the interconnected computing components form a distributed computing environment storing a distributed collection of interlinked, user-viewable hypertext documents accessible via the communication interface. Optionally, the wide area computer network can be implemented as client server architecture including client and server software components which provide access to such documents using standardized protocols. For example, standard protocol for locating and acquiring Web documents may be Hypertext Transfer Protocol (HTTP) and the Web pages are encoded using Hypertext Mark-up Language (HTML). Optionally, the wide area computer network refers to a global network of computers encompassing future mark-up languages and transport protocols that can be used in place of (or in addition to) Hypertext Mark-up Language (HTML) and Hypertext Transfer Protocol (HTTP) for communication.

According to an embodiment, the present disclosure provides an interactive user interface for the operations of content curation. Throughout the present disclosure, the term "interactive user interface" relates to an arrangement that allows for interaction between the user and the automated content curation system. The interactive user interface allows for obtaining inputs from the user and providing user-friendly, systematic, easily comprehensible, and customisable representations of information to the user. As a result, the interactive user interface facilitates the user in better organizing, viewing, analysis, and processing of information related to various fields. In another embodiment, the interactive user interface described herein can be easily implemented by way of the hardware system of the content curation.

Throughout the present disclosure, the term "one or more fields" relates various field of technology such as (but not limited to) mechanical, electronics, data science, electrical, computer science and engineering, industrial and manufacturing, pharmaceuticals, biotechnology and so forth.

Throughout the present disclosure, the term "content" refers to any information presented in a user consumable format. The content may include information present in text files, presentation slides, portable document files, and so forth. Furthermore, the content may include information present on the internet in the form of webpage and so on. Optionally, the content may include lists, tables, charts, graphs, slides, presentations, drawings, illustrations and so on.

According to an embodiment of the present disclosure, the processing arrangement is configured to receive a selection of one or more content from a plurality of pre-existing content associated with the one or more fields. The plurality of pre-existing content comprises either curated and/or non-curated content. In an embodiment of the present disclosure, the processing arrangement receives the user's selection of one or more content in the form of slides, images and so forth, from the plurality of pre-existing content via the interactive user interface. For receiving the at least one content from the pre-existing content associated with one or more fields, the processing arrangement firstly receives the user's selection of at least one section displayed on the interactive user interface of the content curation system. A user may find the plurality of content by selecting section such as, but not limited to, industries, practices, assets, case studies and so forth. Furthermore, in a particular embodiment, the processing arrangement receives the selection of underlying subsection for retrieving the required content and display it to the interactive user interface. Optionally, various fields of technology such as mechanical engineering, electrical engineering, electronics, biotechnology, pharmaceutical and the likes are defined as underlying subsections for the various sections provided at the interactive user interface of the content curation system. The content is maintained in a structured database from the plurality of databases, at the backend of the data curation tool, wherein the data/content such as tabular data, list of industries, packages, etc. are stored in a table and are queried. The images, thumbnails, slides and so forth are stored in blob storage, and a script is written to retrieve the blob storage URLs and store it in a SQL table for further easy retrieval.

According to another embodiment, the processing arrangement is configured to retrieve one or more content associated with the selected section and/or the selected underlying subsection and display the one or more content at the interactive user interface. In a particular embodiment, the retrieved one or more content from the selection of at least one section and/or subsections, are displayed as one or more of: the slides, thumbnails, images, and so forth. Optionally, the retrieved one or more content from the selection of section and/or underlying subsection may also be of the form of Microsoft® office document such as Microsoft® power point presentation, spreadsheets, word files and pdf, plain text documents and so forth. In a further embodiment, the interactive user interface of the content curation system enables the user to scroll through the plurality of content displayed on the user interface. The one or more content from the specific selected sections and/or subsections are only displayed. The processing arrangement operates in such a manner that the load time of fetching the relevant documents and/or thumbnails is greatly reduced.

Optionally, the processing arrangement provides the blown-up version of the one or more content such as slide or thumbnail by receiving a click on a certain part of the thumbnail by the user. In another embodiment, the blown-up version is shown at the user interface by receiving the selection of "I" button on the top right-hand corner of the slide. In a further embodiment, the blown-up version may also be provided by the processing arrangement by simply positioning the cursor to the position of the slide/thumbnails/images.

In an exemplary embodiment, the processing arrangement also enables the user to fetch other metadata like "owner of the slide", "any comments" and so forth by clicking on a certain section provided therein. In a particular embodiment, the processing arrangement enables the user to fetch other metadata like "owner of the slide", "any comments" and so forth by clicking on "I" button provided therein. selection of at least one content. In further embodiment, the processing arrangement also receives the selection of all the content. The selected content as described herein may be in the form of selected thumbnails, images, slides, Microsoft® power point presentation, pdf, Microsoft® office files, spreadsheets and so forth. Herein, the processing arrangement enables the user to select the specific at least one content based on the user's requirements. The "blown-up" is referred to as zooming of the slides and images and also known as "front end zoom feature". The front end zoom feature is developed using Angular. Selection of a single or all slides is also done using Angular as front-end feature.

The processing arrangement receives a user's selection of one or more content from the plurality of pre-existing content associated with the one or more fields. The pre-existing relevant content are retrieved first by selecting the section and/or the subsections and then after selecting a particular section and/or the underlying subsection, the processing arrangement fetches and displays the retrieved one or more content. In an embodiment, the processing arrangement receives the selection of at least one content. In further embodiment, the processing arrangement also receives the selection of all the content. The selected content as described herein may be in the form of selected thumbnails, images, slides, Microsoft® Power Point Presentation, pdf, Microsoft® office files, spreadsheets and so forth. Herein, the processing arrangement enables the user to select the specific at least one content based on the user's requirements. The "blown-up" is referred to as zooming of the slides and images and also known as "front end zoom feature". The front end zoom feature is developed using Angular. Selection of a single or all slides is also done using Angular as front-end feature.

According to the present disclosure, there is provided a system of developing a search database for automated content curation. The system comprises a processing arrangement comprising a communication interface for accessing a computer network and a database arrangement. The processing arrangement as in accordance with the teachings of the present disclosure, is configured to store a plurality of slides related to one or more fields in the database arrangement and generate a plurality of thumbnails from the stored plurality of slides in the database arrangement. The processing arrangement then extracts a plurality of metadata from the plurality of thumbnails, wherein the plurality of metadata is extracted by processing the generated plurality of thumbnails through an optical character reader. The extracted plurality of metadata is thereby stored into a search database. Furthermore, the processing arrangement creates an index comprising of associations between the plurality of slides, the plurality of associated metadata and the generated plurality of thumbnails and stores the created index in the search database. Herein the created index, the plurality of metadata is associated with the generated plurality of thumbnails and the one or more slides. The processing arrangement is then configured to curate a plurality of content from the index of the search database based on one or more search strings.

In an exemplary embodiment, the system as defined herein generally provides the "content explorer" service. For example, the user using the content explorer, can find and create custom decks from the slides repository in the database arrangement as provided by the content curation tool. The invention as described herein enables the users to find and create custom decks in the form of a curated file and allows user to explore, search and identify data elements such as slides, and images from various research papers, Microsoft® Power Point Presentation slides, word files, pdf, images and so forth from research and organizational dataset. The invention also enables the users to search for a specific paper by its title and images embedded in the organizational documents.

The processing arrangement is configured to generate a plurality of thumbnails from the stored plurality of slides stored in the database arrangement. In an embodiment, the "thumbnail" typically refers to a smaller image that represents a larger image. Thumbnails can represent static images. Thumbnail images can also represent slides and other media. In many instances, it is important that a thumbnail accurately represents media with which it is associated. Specifically, the thumbnails are reduced-size representations of the original image, slides or of the other type of content.

According to an embodiment, the processing arrangement automatically generates the thumbnails of the one or more slides from the plurality of slides stored in the database arrangement. The processing arrangement uses an App-script based code that is written to generate thumbnails of the slides or images and store them in the database arrangement, for example, a Google® drive or a cloud. The code works on creating thumbnails of the source slides and storing them on a folder in the database arrangement. Also, they will further be uploaded to the database arrangement.

In accordance with another embodiment of the present disclosure, the processing arrangement generates a visual representation/thumbnails of the plurality of images or slides by extracting one or more features of the stored at least one slide or image via at least one of, but not limited to, an object recognition algorithm, image recognition algorithm and text recognition algorithm. Furthermore, the extracted features are quantized thereafter to obtain a visual representation of the image. Herein, quantization is the process of constraining an input from a continuous or otherwise large set of values to a discrete set. The one or more extracted features of the received at least one image are converted into a discrete set in the process of quantization of the extracted one or more features of the received at least one image. In another embodiment, the one or more extracted features of said image comprises at least color(s), parts and/or patterns of an object in an image, histogram of the oriented gradient in an image, convolutional neural network and so forth. The system as described herein employs a deep learning algorithm that takes in an input image, assign importance (learnable weights and biases) to various aspects/objects/texts in the image and be able to differentiate one image or slide from the other. Herein, the algorithm use image recognition and classification in order to detect objects, texts and even faces etc. They are made up of neurons with learnable weights and biases. The images/slides are primarily classified and clustered thereafter by considering the similarities. The object recognition in the plurality of slides/images are performed thereafter via the object recognition algorithm. Optionally, the image recognition is performed in the plurality of slides/images via an image recognition algorithm. More optionally, the images/slides are also processed through the text recognition algorithm. Other visual features may also be used additionally or alternatively.

In accordance with an embodiment of the present disclosure, there is described a naming convention of thumbnail in the present disclosure. The naming convention of the thumbnail, used by the processing arrangement tries to capture all the information or metadata needed, to sue it further. In a particular embodiment, the processing arrangement receives the user's selection of the specific section that are required to be updated. The user herein, is being referred to as a team of the content curation system who are having a Google® sheet or a spreadsheet or any other type of document, with buttons and drop down to select the specific section that needs to be updated. The team select the specific section to be updated and it generates a set of thumbnails and store the generated set of thumbnails in a specified location (for example, a specified drive location) of the database arrangement.

Furthermore, in another embodiment, the processing arrangement also enables the users to upload the generated thumbnails onto a database arrangement, namely cloud storage. Uploading the generated thumbnails onto a database arrangement triggers an automated cloud function script that creates tables/databases storing the image and its associated metadata that would further be used. In another embodiment, the processing arrangement automatically triggers a cloud function scrip that creates tables/databases storing the images and its associated metadata.

After generating a plurality of thumbnails from the stored plurality of slides, the processing arrangement thereafter extracts a plurality of metadata from the plurality of thumbnails, wherein the plurality of metadata is extracted by processing the generated plurality of thumbnails through an optical character reader. Furthermore, the processing arrangement creates an index comprising of associations between the plurality of slides, the plurality of associated metadata and the generated plurality of thumbnails and stores the created index in the search database.

According to an embodiment, all the thumbnails generated from the slides and/or images have some metadata associated with it and the metadata is basically the content in the thumbnails including text, title, description, object, face and so forth. These are extracted and stored in a search database with the required indexing. The metadata of thumbnails are extracted via an optical character recognition software or also known as optical character reader. In a particular embodiment, the metadata associated with the thumbnails are extracted and stored in an elastic search database. Optionally, the metadata associated with the thumbnails or extracted from the plurality of thumbnails are stored in an elastic search database with the required indexing.

In accordance with the present invention, the system as provided herein comprises a processing arrangement that is configured to store the extracted plurality of metadata into a search database. In an embodiment, the search database is created to facilitate the retrieval of relevant content as desired by the user.

In a particular embodiment of the present disclosure, the processing arrangement is configured to triggers a function (for example, cloud function script) that passes the images or slides through a Vision API based Optical Character Recognition (OCR) pipeline to extract metadata from an image and stores all the metadata onto the elastic search indexes. The image content level metadata is therefore generated.

In accordance with certain embodiments, an Optical Character Recognition (OCR) approach as described herein can be used to obtain all or portions of one or more of the above metadata. Many OCR software modules which operate on numerous operating systems can be used to carry out the OCR processes described herein, and therefore, they will not be described in great detail. In accordance with another embodiment consistent with the present invention, OCR and/or pattern recognition techniques are utilized to capture metadata.

Since the process for metadata generation is automated, it becomes extremely crucial to prioritize which metadata to be focused on. Hence, the processing arrangement in accordance with an embodiment, employs Elastic search libraries and tools to prioritize more on the Headings or titles as opposed to other content.

As previously discussed, the thumbnails are generated, and metadata of the generated thumbnails are extracted thereafter. The extracted metadata is then stored in a search database (or for example, a search library). The present invention involves creating an index that comprises associating the metadata with the generated plurality of thumbnails and plurality of slides, wherein said associations are employed to facilitate retrieval of relevant content namely, slides and/or images in response to a user's search query. Said created index by the processing arrangement is then stored in a search database. In a particular embodiment, the processing arrangement is configured to store the created index in one or more of elastic search databases. According to an embodiment of the present disclosure, the processing arrangement is configured to receive the user's input for searching the relevant one or more content. In an embodiment, the user's input may be in the form of keywords, search strings, and so forth for retrieving out the relevant content from the plurality of slides and/images associated with the one or more fields. The processing arrangement enables the users to surf through the database arrangement to search at least a relevant content from the pool of data elements pre-existing in the database arrangement. The user can search through the system's content by surfing through the thumbnails available by a simple search mechanism. Furthermore, the search can be narrowed down to surf through a specific database to narrow down the search results. In an embodiment, the processing arrangement employs the plurality of metadata extracted from the generated plurality of thumbnails to retrieve the one or more relevant slides via a fuzzy logic, wherein the one or more relevant slides/images are retrieved in response to the user's provided search strings. In a further embodiment, the search tool does a key word match/fuzzy logic on the metadata on the elastic search database and retrieve the result based on a custom rule which associates more weight on the title of a slide in order to improve ranking. As opposed to the common convention, where taggers and annotators sit to read through slides and extract relevant metadata in terms of the title or description of the slide, the disclosed system in a particular embodiment, uses vision (off the shelf Google's Vision API) to perform OCR and extract all the textual content on the image(slide). This identifies image logos, and associated details with some content that is not in standard textual format, for example the logo of a ""Angular/Node JS"", the term Node JS is extracted and stored as metadata.

In an embodiment, the processing arrangement receives a user's input in the form of a search query or in the form of search strings. The one or more keywords or query segments are extracted from said search query and are employed for retrieving relevant content from the search database.

In an embodiment, the query segments are stored in a meta-document. In an example, the query segments for the search query "the best cold coffee" are "the", "best", "cold", "coffee". As previously discussed, the processing arrangement creates an index comprising of associations between the plurality of slides stored in the database arrangement, the generated plurality of thumbnails and its associated metadata. Optionally, the processing arrangement associates the plurality of slides with the generated thumbnails and its associated metadata in the form of a list or a table and stores said list comprising the association between the plurality of slides, the generated plurality of thumbnails and its associated metadata in the search database. Optionally, the created index is stored in an elastic search library in the search database. More optionally, the index comprising the associations between the plurality of slides, the plurality of thumbnails and the associated metadata by way of a list, a table or any other way of structured storing that represents said association. Beneficially, storing the plurality of slides corresponding to the plurality of thumbnails and its associated metadata makes it easier to retrieve the plurality of slides relevant to the user's search query.

There exists a significant contribution of the created index in minimizing the time required to retrieve a relevant content in the form of slides/images from the search database. While searching for the relevant content, the system as described herein refers the plurality of metadata that is associated with the generated plurality of thumbnails and the plurality of thumbnails are in-turn associated with the plurality of slides. Since the plurality of metadata and the plurality of thumbnails are the reduced size version of the plurality of slides, the system while retrieving the relevant content consumes a relatively lesser amount processing power as the system has to retrieve a relatively smaller size content. Consequently, the system as provided in the present disclosure is more efficient than the conventional relevant content retrieval systems.

In an embodiment, the processing arrangement stores the created index in one or more of the elastic search databases. The search query may or may not be in the form of search strings. Furthermore, in an embodiment, the one or more content is ranked in accordance with the priority of their relevancy. Herein this embodiment, the processing arrangement applies a code and/or logic to show up the prioritized content higher in the ranked list.

In accordance with the present disclosure, the processing arrangement curate a plurality of content from the index of the search database based on one or more search strings. In an embodiment, the processing arrangement receives the one or more search strings via a user's input and retrieves the one or more slides via the index stored in the search database, in response to the one or more search strings.

Furthermore, in another embodiment, the processing arrangement receives a user's selection of the one or more slides from the retrieved plurality of the one or more slides and curate the plurality of content by copying the selected one or more slides from a source location to a curated file at a target location, wherein a linking of the copied one or more slides at the target location is established with the one or more slides at the source location.

In another embodiment, the processing arrangement enables the users to edit and/or rearrange the slides/thumbnails in the preferred order. The slides or thumbnails or the images and the likes can be dragged and rearranged by the user in a preferred manner.

Furthermore, the processing arrangement enables the user to add a blank deck URL. It comprises validation on the URL as well to identify any invalid URLs entered by the URLs. Herein, the processing arrangement saves the location of the compiled file.

In an embodiment of the present disclosure, the processing arrangement is configured to curate all the selected at least one content as a file, wherein the curated file includes a compilation of the selected at least one content. Furthermore, the processing arrangement stores the compiled file in a target location (target URL) of the plurality of databases. Herein, the system enables the user to name the compiled file that is being created for the user's personal record. In another embodiment, the name of the compiled file is being stored by the processing arrangement in a SQL database to display on the landing profile page.

In a particular embodiment, the processing arrangement as disclosed herein triggers an API created at the backend using Google® App-script, that is configured to accept inputs such as array of images and metadata, target deck URL. Furthermore, the processing arrangement provides a custom script in the backend that works using Google® slides to create the new deck or a new compiled file of images/thumbnails/slides, or append the selected slides to the end of an existing deck or the compiled file. Said function is being executed via a single click that triggers the API at the back end. In a particular embodiment, the aforementioned API has been created internally, with a custom code, that basically extracts the metadata associated with the images (provided in the array input), and surfs through the backend repository of the deck and further extracts the right slides based on a unique identifier (slide ID). It will be appreciated that the slides are then copied from the source to the destination. Beneficially, any change in the source would reflect across all the target decks and ensure the content is up to date.

According to an embodiment of the present disclosure, the processing arrangement is configured to dispatch a communication to the user with the target location of the curated file. In an example, the user will receive a mail from the content curation system with a link to the curated file or also known as compiled file of the selected plurality of slides. In a specific embodiment, the communication may be in the form of email or text, SMS and so forth.

In an embodiment, the processing arrangement is configured to receive a further selection of the one or more slides and add the selected one or more slides at an end of the curated file. In a specific embodiment, the processing arrangement receives the selection of case studies and adds them at the end of the compiled file or the compiled deck. Furthermore, an array of the added content at the end of the curated file is created by the processing arrangement, wherein the array acts as an index for the added content. In a further specific embodiment, a table of case studies is thus created that acts as an index table to all the case studies added. A sub script in the API at the backend adds the case study slides/added content slides at the end, works on a slide linking logic to create an appendix table linking case studies to the respective slides as well.

According to an embodiment, the processing arrangement enables one or more users to suggest changes in the one or more slides stored in the database arrangement. In an embodiment, the system enables the users to suggest changes or corrections in the form of comments on a particular content. Optionally, the processing arrangement is configured to transmit a response communication to the one or more users stating a status of the suggested changes to the one or more slides. More optionally, upon receiving the suggestions or comments made by the user, the processing arrangement automatically dispatches a communication to the owner or administrator of the content about the suggested changes made by the user and the location or link to the specific compiled file or the deck or the slide/image/thumbnail from the plurality of content or slides or images stored in the plurality of databases. In a specific embodiment, the communication may be in the form of email or text, SMS and so forth.

In a further embodiment of the present disclosure, an app-script function is provided that automatically create presentations based on the images selected. Additionally, the present invention can also link one or more case studies to create the index table. The metadata from the created presentations and documents are generated and it is being done via Vision API (application programming interface) based OCR pipeline. In a specific embodiment, the search mechanism for the relevant result is based on prioritization of data.

The present disclosure also relates to the method as described above. Various embodiments and variants disclosed above apply mutatis mutandis to the method.

Optionally, the method comprises receiving the one or more search strings via a user's input and retrieving the one or more slides via the index stored in the search database, in response to the one or more search strings.

Optionally, the method comprises receiving a user's selection of the one or more slides from the retrieved plurality of the one or more slides and curating the plurality of content by copying the selected one or more slides from a source location to a curated file at a target location, wherein a linking of the copied one or more slides at the target location is established with the one or more slides at the source location.

Optionally, method comprises dispatching a communication to the user with the target location of the curated file.

Optionally, the method comprises receiving a further selection of the one or more slides and adding the selected one or more slides at an end of the curated file.

Optionally, the method comprises creating an array of added content in the curated file, wherein the array acts as an index for the added content.

Optionally, the method comprises enabling one or more users to suggest changes in the one or more slides stored in the database arrangement.

Optionally, the method comprises transmitting a communication to an administrator of the one or more slides when the one or more users suggest changes in the one or more slides.

Optionally, the method comprises transmitting a response communication to the one or more users stating a status of the suggested changes to the one or more slides.

The present disclosure also provides a non-transitory computer readable storage medium, containing program instructions for execution on a computer system, which when executed by a computer, cause the computer to perform method steps of a method of developing a search database for automated content curation, the method comprising the steps of: storing a plurality of slides related to one or more fields in the database arrangement, generating a plurality of thumbnails from the stored plurality of slides, extracting a plurality of metadata from the plurality of thumbnails, wherein the plurality of metadata are extracted by processing the generated plurality of thumbnails through an optical character reader, storing the extracted plurality of metadata into a search database. The method steps further comprising creating an index comprising of associations between the plurality of slides, the plurality of associated metadata and the generated plurality of thumbnails, storing the created index in the search database, and curating content from the index of the search database based on one or more search strings.

DESCRIPTION OF THE DRAWINGS

Figure 1:
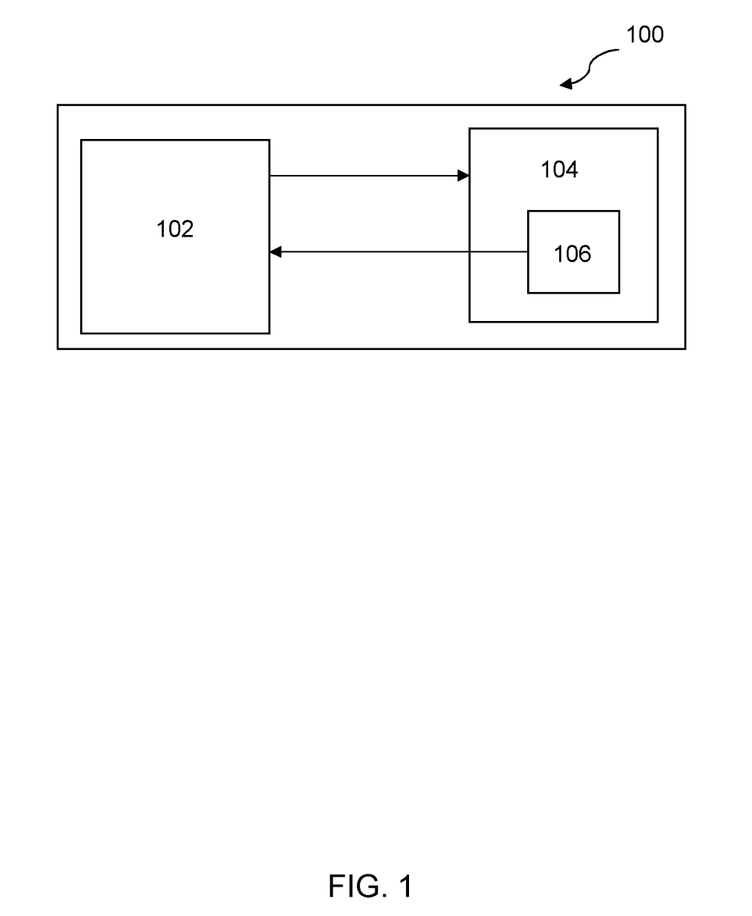
FIG. 1 is a schematic illustration of a system of developing a search database for automated content curation, in accordance with an embodiment of the present disclosure.

Referring to FIG. 1, there is shown a schematic illustration of a system 100 of developing a search database for automated content curation, in accordance with an embodiment of the present disclosure. The system 100 comprises a database arrangement 102 and a processing arrangement 104. The processing arrangement further comprises a communication interface 106 for accessing a computer network and the database arrangement 102.

Figure 2:
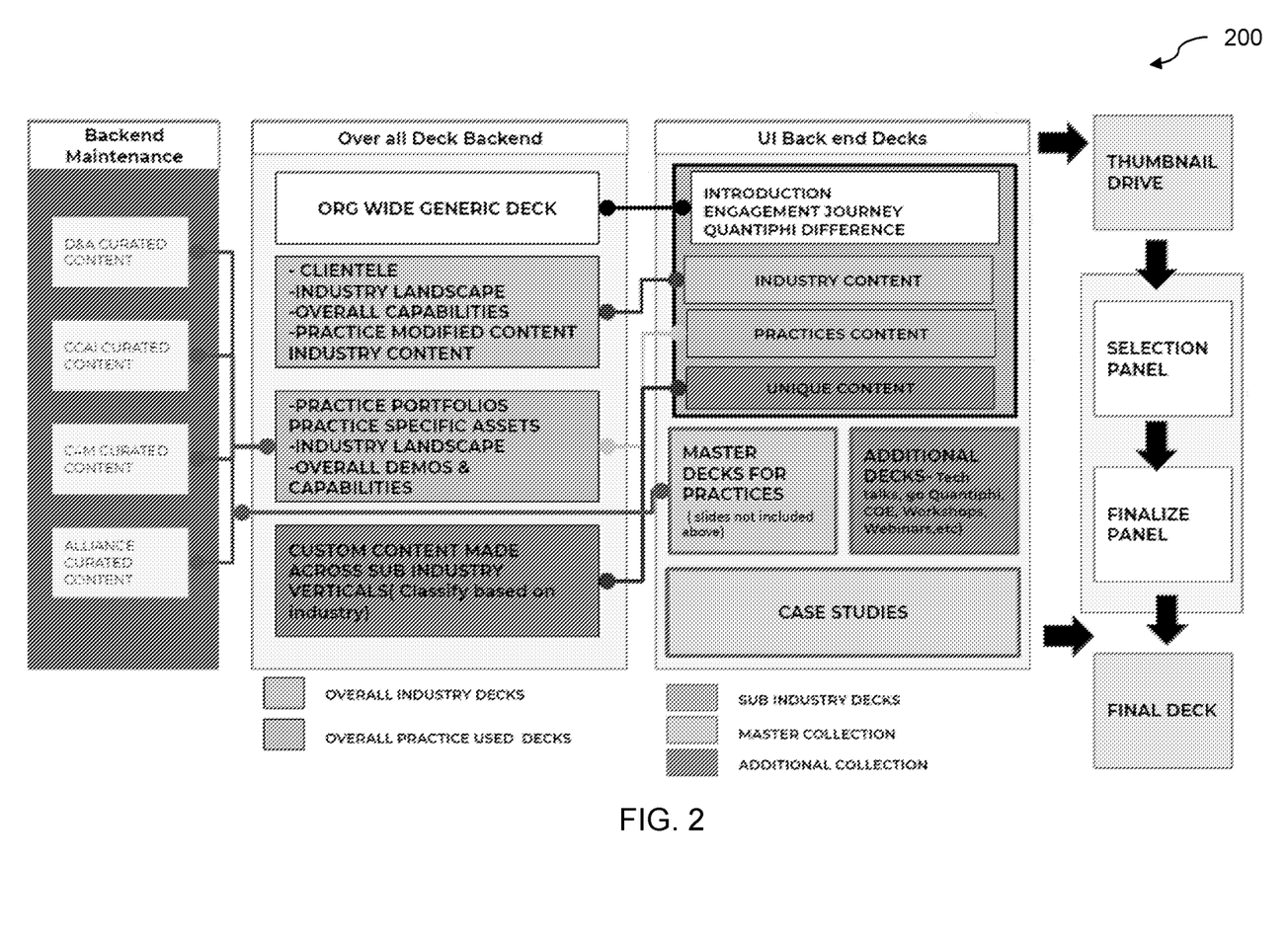
FIG. 2 is a schematic illustration of a flow diagram of the content movement architecture of the automated content curation system, in accordance with an embodiment of the present disclosure.

Referring to FIG. 2, there is shown a schematic illustration of a flow diagram of the content movement architecture of the automated content curation system 200, in accordance with an embodiment of the present disclosure. In an embodiment of the present disclosure, the content is generally processed in backend maintenance overall deck backend, and the User interface backend decks. The processing arrangement as described in the present disclosure receives the user's selection of the section, but not limited to, industry content, practices content, unique content and so forth for the retrieval of the relevant content required by the user. In the section "industry content", the processing arrangement provides the knowledge related to various industries and clients such as industry landscapes, overall capabilities, practice modified content, industry content and the likes. Furthermore, the processing may also receive the user's selection of the section —"practice content", wherein the practice content comprises the organizational studies such as practice portfolios, practice specific assets, industry landscapes, overall demos and capabilities associated with a required field of technology or social or organizational purpose. Also, UI Backend further includes unique content that acquires custom content made across sub-industry verticals. The unique content comprises custom content made across sub industry verticals which is classified based on the related industry. The processing arrangement may also receive the user's selection of underlying subsections of the section as provided above. The master content comprises the content stored in the backend maintenance. The additional content comprises talks, webinars, workshops and so forth. In an embodiment, the one or more content may be in the form of slides, images, thumbnails and so forth. The processing arrangement further receives the selection of one or more content (thumbnail, slides, images) displayed by the thumbnail drive and enable the user to finalize the deck as in accordance with user's requirements. In other words, the processing arrangement is configured to compile/curate all the selected content as a compiled file and store the compiled file in a target location of the plurality of databases. After the selection, the content can be finalized in the finalize panel. The finalization of the content generates final content relevant to the user in the desired format.

Figure 3:
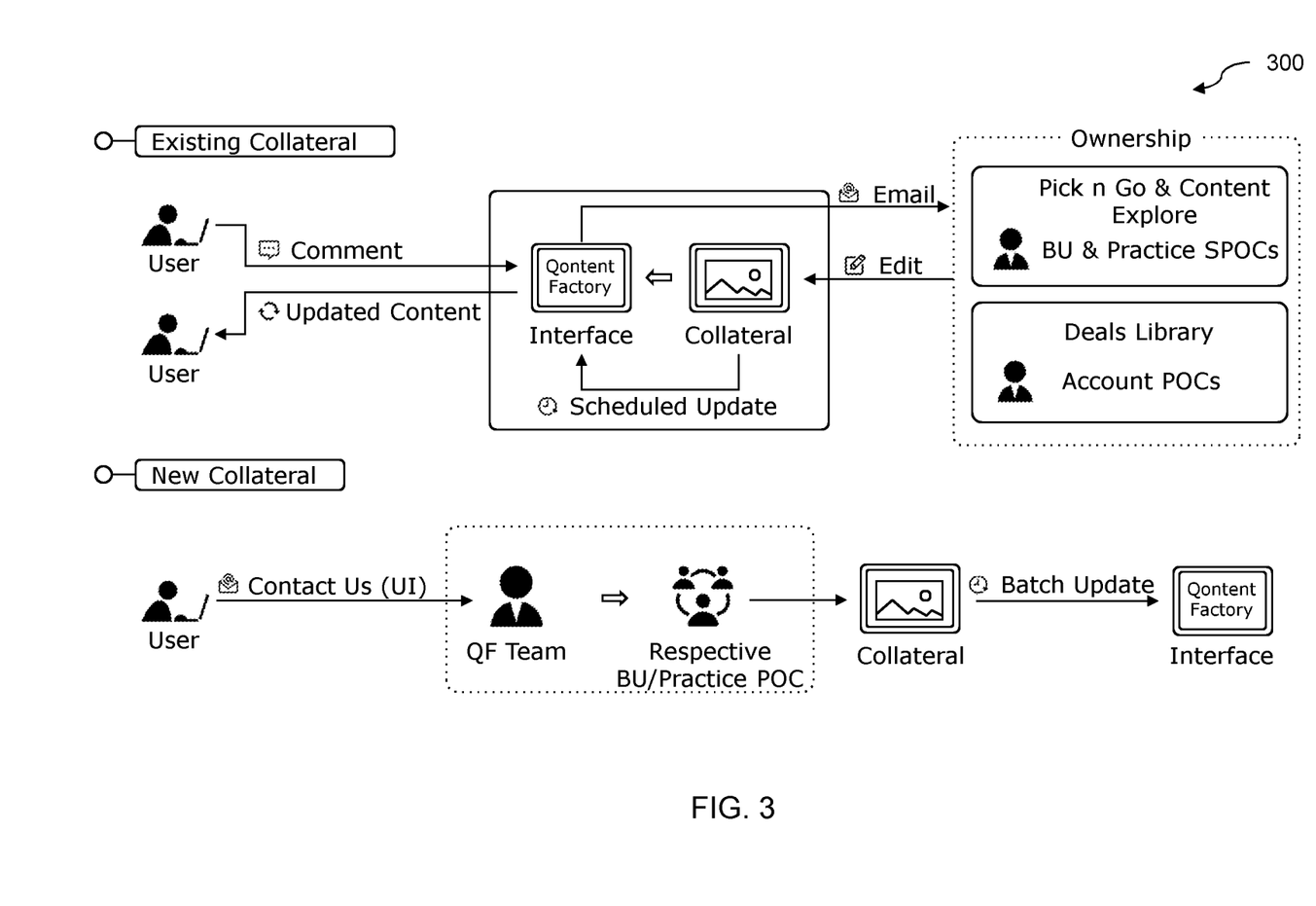
FIG. 3 is a schematic illustration of a flow diagram of content change management of the automated content curation system, in accordance with an embodiment of the present disclosure.

Referring to FIG. 3, there is shown a schematic illustration 300 of a flow diagram of content change management of the automated content curation system 100, in accordance with an embodiment of the present disclosure. Beneficially, the present disclosure facilitates the user to provide suggestions in the form of comments for the correction to prevent the content data from becoming outdated. Herein, the processing arrangement is configured to receive the user's suggestion in the form of comments. Upon receiving the user's comment, an automated communication is transmitted to the owner or administrator of the particular content on which the comment has been received. In an embodiment, once the owner act on the received comment and resolve the correction received, the processing arrangement will transmit a response communication to the commenter regarding the status of the comment. In an example, the status may provide the commenter whether his query has been resolved or not. Furthermore, the content data in the plurality of databases is updated accordingly. In an embodiment, the processing arrangement also enables the content to be changed with a new collateral. Herein, the system simply receives the user's suggestion via an e-mail and the suggestion is then transmitted to the respective content practice POC. Furthermore, the processing arrangement receive inputs of the respective practice POC and update the one or more content accordingly.

Figure 4:
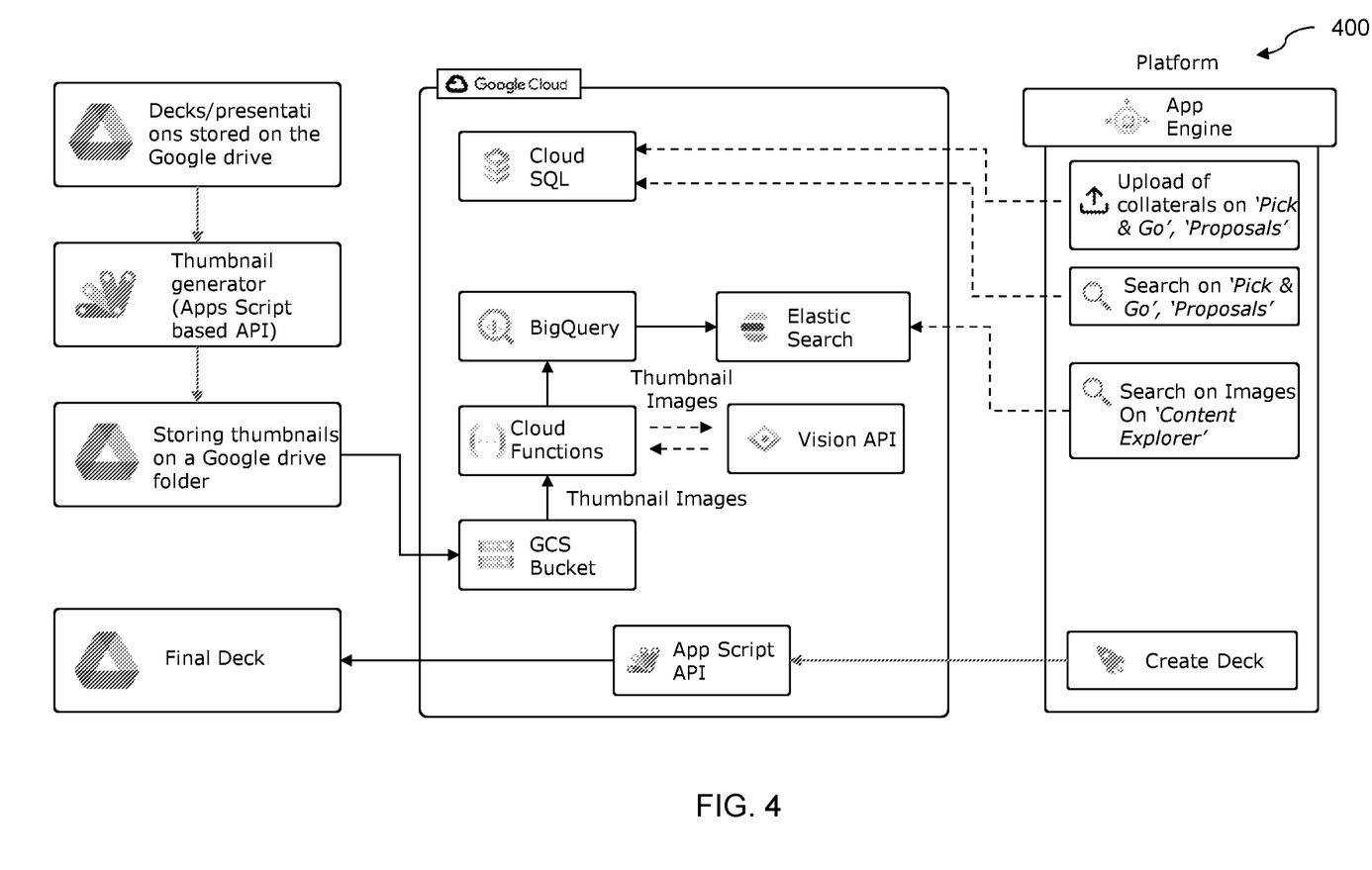
FIG. 4 is a schematic illustration of the system, in accordance with an embodiment of the present disclosure.

Referring to FIG. 4, there is shown a schematic illustration 400 of the system 100, in accordance with an embodiment of the present disclosure. The system comprises a user interface as a platform or app engine. After the secured access to the system, the user can interact with the platform for uploading the finished and/or the unfinished content in the form of a collateral in the Pick and Go mode of the system. In an embodiment, the Pick and Go mode of system includes a mode in the present invention in which the user is simply enabled to search for a particular content and the relevant content is retrieved thereafter. The user is also enabled to search the Pick and Go mode to retrieve the previously uploaded finished and/or unfinished content. The user's action of uploading or searching the in the Pick and Go mode triggers SQL queries in the cloud SQL to respond to the user's action. Based on the user's action, the relevant content is either uploaded to the database arrangement or retrieved from the database arrangement. In the Explorer mode, the user is enabled to search on the content present in the form of images using the metadata of the content (images). The user's search of the images triggers Elasticsearch database wherein the finished and/or the unfinished content is stored along with the extracted metadata. In the backend, the content (in the form of decks or presentations) is stored on the database arrangement. A thumbnail generator which is an Apps Script based API runs on the content to generate thumbnails relevant to the content. The generated thumbnails are stored in the database arrangement in the folders specified for the thumbnails. The folders specified for the thumbnails in the database arrangement are linked to Google Cloud Service bucket to enable querying of the thumbnails. The Google Cloud Service bucket provide the thumbnails to the Cloud Functions where the Vision API process the thumbnails generating the metadata and identifying the information stored in the thumbnails. The processed thumbnails are provided to the Big Query which in turns provides the processed thumbnails to the Elasticsearch database for identifying relevant content to the user in the Explorer mode. After the identification of the relevant content, the user clicks Deck Create on the platform that in turn triggers App Script API in the data processing arrangement which creates deck and stores the created deck in the database arrangement.

Figure 5:
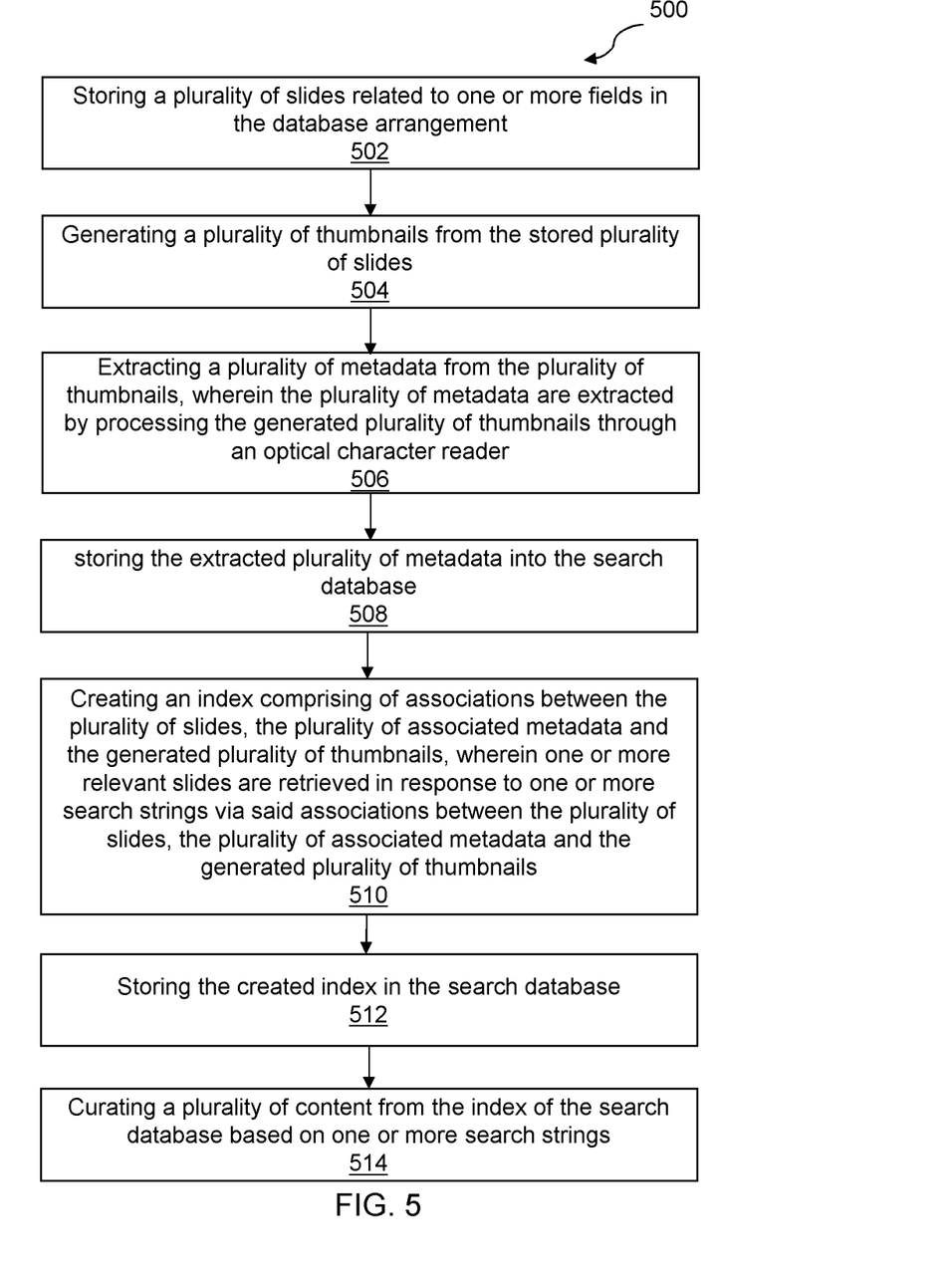
FIG. 5 a schematic illustration of a flow diagram of a method of developing a search database for automated content curation, in accordance with an embodiment of the present disclosure.

Referring to FIG. 5, there is shown a schematic illustration of a flow diagram of a method 500 of developing a search database for automated content curation, in accordance with an embodiment of the present disclosure. At a step 502, the method comprises storing a plurality of slides related to one or more fields in the database arrangement. At step 504, the method comprises generating a plurality of thumbnails from the stored plurality of slides. Thereafter at step 506, the method comprises extracting a plurality of metadata from the plurality of thumbnails, wherein the plurality of metadata is extracted by processing the generated plurality of thumbnails through an optical character reader. At step 508, the method comprises storing the extracted plurality of metadata into a search database and at step 510, the method comprises creating an index comprising of associations between the plurality of slides, the plurality of associated metadata and the generated plurality of thumbnails, wherein one or more relevant slides are retrieved in response to one or more search strings via said associations between the plurality of slides, the plurality of associated metadata and the generated plurality of thumbnails. At a further step 512, the method comprises storing the created index in the search database. At step 514, the method comprises Curating a plurality of content from the index of the search database based on one or more search strings.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural where appropriate.

The invention claimed is:

1. A system of developing a search database for automated content curation, wherein the system comprises:
a processing arrangement comprising a processor, a communication interface for accessing a computer network and a database arrangement, wherein the processing arrangement is configured to:
store a plurality of slides related to one or more fields in the database arrangement;
generate a plurality of thumbnails from the stored plurality of slides;
extract a plurality of metadata from the plurality of thumbnails, wherein the plurality of metadata is extracted by processing the generated plurality of thumbnails through an optical character reader;
store the extracted plurality of metadata into the search database;
create an index comprising of associations between the plurality of slides, the plurality of associated metadata and the generated plurality of thumbnails;
store the created index in the search database;
receive one or more search strings via a user's input of a computing device;
in response to the received one or more search strings, retrieve a plurality of one or more relevant slides via the index stored in the search database, wherein the plurality of one or more relevant slides are retrieved in response to the one or more search strings via said associations between the plurality of slides, the plurality of associated metadata, and the generated plurality of thumbnails;
automatically curate a plurality of content from the index of the search database based on the one or more search strings; and
receive a user's selection of one or more slides from the retrieved plurality of the one or more relevant slides at a source location and curate the plurality of content by copying the selected one or more slides from the source location to a curated file at a target location, wherein a linking of the copied one or more slides at the target location is established with the selected one or more slides at the source location.

2. The system of claim 1, wherein the processing arrangement is configured to generate a plurality of thumbnails by extracting one or more features of the plurality of slides via at least one of an object recognition algorithm, an image recognition algorithm, and a text recognition algorithm.

3. The system of claim 1, wherein the plurality of metadata extracted from the plurality of thumbnails is stored in an elastic search database.

4. The system of claim 1, wherein the processing arrangement is configured to store the created index in one or more of elastic search databases.

5. The system of claim 1, wherein the processing arrangement employs the plurality of metadata extracted from the generated plurality of thumbnails to retrieve the one or more relevant slides via fuzzy logic.

6. The system of claim 1, wherein the processing arrangement generates a plurality of thumbnails via an app-script based code.

7. The system of claim 1, wherein the processing arrangement dispatches a communication to the user with the target location of the curated file.

8. The system of claim 1, wherein the processing arrangement is configured to receive a further selection of the one or more slides and add the selected one or more slides at an end of the curated file.

9. The system of claim 1, wherein the processing arrangement is configured to create an array of added content in the curated file, wherein the array acts as an index for the added content.

10. The system of claim 1, wherein the processing arrangement enables one or more users to suggest changes in the one or more slides stored in the database arrangement.

11. The system of claim 1, wherein the processing arrangement is configured to transmit a communication to an administrator of the one or more slides when the one or more users suggest changes in the one or more slides.

12. The system of claim 1, wherein the processing arrangement is configured to transmit a response communication to the one or more users stating a status of the suggested changes to the one or more slides.

13. A method of developing a search database for automated content curation, wherein the method comprises:
storing, by a processing arrangement comprising a processor, a communication interface for accessing a computer network and a database arrangement, a plurality of slides related to one or more fields in the database arrangement;
generating, by the processing arrangement, a plurality of thumbnails from the stored plurality of slides;
extracting, by the processing arrangement, a plurality of metadata from the plurality of thumbnails, wherein the plurality of metadata is extracted by processing the generated plurality of thumbnails through an optical character reader;
storing, by the processing arrangement, the extracted plurality of metadata into the search database;
creating, by the processing arrangement, an index comprising of associations between the plurality of slides, the plurality of associated metadata, and the generated plurality of thumbnails;
storing the created index in the search database;
receiving one or more search strings via a user's input of a computing device;
in response to the received one or more search strings, retrieving a plurality of one or more relevant slides via the index stored in the search database, wherein the plurality of one or more relevant slides are retrieved in response to the one or more search strings via said associations between the plurality of slides, the plurality of associated metadata, and the generated plurality of thumbnails;
automatically curating a plurality of content from the index of the search database based on the one or more search strings; and
receiving a user's selection of one or more slides from the retrieved plurality of the one or more relevant slides at a source location and curate the plurality of content by copying the selected one or more slides from the source location to a curated file at a target location, wherein a linking of the copied one or more slides at the target location is established with the selected one or more slides at the source location.

14. The method of claim 13, wherein the method comprises generating a plurality of thumbnails by extracting one or more features of the plurality of slides via at least one of an object recognition algorithm, an image recognition algorithm and a text recognition algorithm.

15. The method of claim 13, wherein the plurality of metadata extracted from the plurality of thumbnails is stored in an elastic search database.

16. The method of claim 13, wherein the method comprises storing the created index in one or more elastic search databases.

17. The method of claim 13, wherein the method comprises employing the plurality of metadata extracted from the generated plurality of thumbnails to retrieve the one or more relevant slides via fuzzy logic.

18. The method of claim 13, wherein the method comprises generating a plurality of thumbnails via an app-script based code.

19. The method of claim 13, wherein the method comprises dispatching a communication to the user with the target location of the curated file.

20. The method of claim 13, wherein the method comprises receiving a further selection of the one or more slides and adding the selected one or more slides at an end of the curated file.

21. The method of claim 13, wherein the method comprises creating an array of added content in the curated file, wherein the array acts as an index for the added content.

22. The method of claim 13, wherein the method comprises enabling one or more users to suggest changes in the one or more slides stored in the database arrangement.

23. The method of claim 13, wherein the method comprises transmitting a communication to an administrator of the one or more slides when the one or more users suggest changes in the one or more slides.

24. The method of claim 13, wherein the method comprises transmitting a response communication to the one or more users stating a status of the suggested changes to the one or more slides.

25. A non-transitory computer readable storage medium, containing program instructions for execution on a computer system, which when executed by a computer, cause the computer to perform method steps of developing a search database for automated content curation, the method comprising steps of:

storing, by a processing arrangement comprising a communication interface for accessing a computer network and a database arrangement, a plurality of slides related to one or more fields in the database arrangement;

generating, by the processing arrangement, a plurality of thumbnails from the stored plurality of slides;

extracting, by the processing arrangement, a plurality of metadata from the plurality of thumbnails, wherein the plurality of metadata is extracted by processing the generated plurality of thumbnails through an optical character reader;

storing, by the processing arrangement, the extracted plurality of metadata into the search database;

creating, by the processing arrangement, an index comprising of associations between the plurality of slides, the plurality of associated metadata and the generated plurality of thumbnails;

storing the created index in the search database;

receiving one or more search strings via a user's input of a computing device;

in response to the received one or more search strings, retrieving a plurality of one or more relevant slides via the index stored in the search database, wherein the plurality of one or more relevant slides are retrieved in response to the one or more search strings via said associations between the plurality of slides, the plurality of associated metadata, and the generated plurality of thumbnails;

automatically curating a plurality of content from the index of the search database based on the one or more search strings; and receiving a user's selection of one or more slides from the retrieved plurality of the one or more relevant slides at a source location and curate the plurality of content by copying the selected one or more slides from the source location to a curated file at a target location, wherein a linking of the copied one or more slides at the target location is established with the selected one or more slides at the source location.

* * * * *